Oct. 5, 1948.  C. R. SACCHINI  2,450,564
FLUID OPERATED MOTOR WITH PISTON ACTUATED DISTRIBUTING
VALVE AND MANUALLY ACTUATED PARKING VALVE
Filed Oct. 2, 1944  3 Sheets-Sheet 1

INVENTOR
COLUMBUS R. SACCHINI
By George M. Louty
ATTORNEY

Oct. 5, 1948.　　　　C. R. SACCHINI　　　　2,450,564
FLUID OPERATED MOTOR WITH PISTON ACTUATED DISTRIBUTING
VALVE AND MANUALLY ACTUATED PARKING VALVE
Filed Oct. 2, 1944　　　　　　　　　　　3 Sheets-Sheet 2
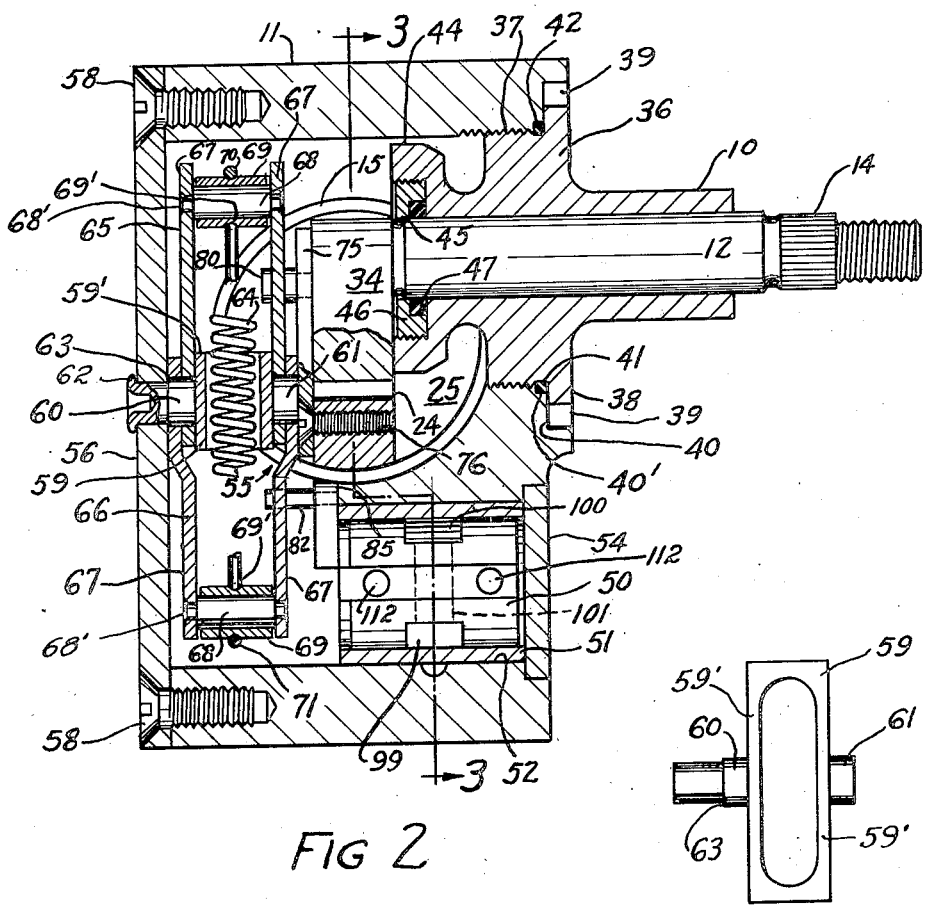
FIG 2
FIG 8
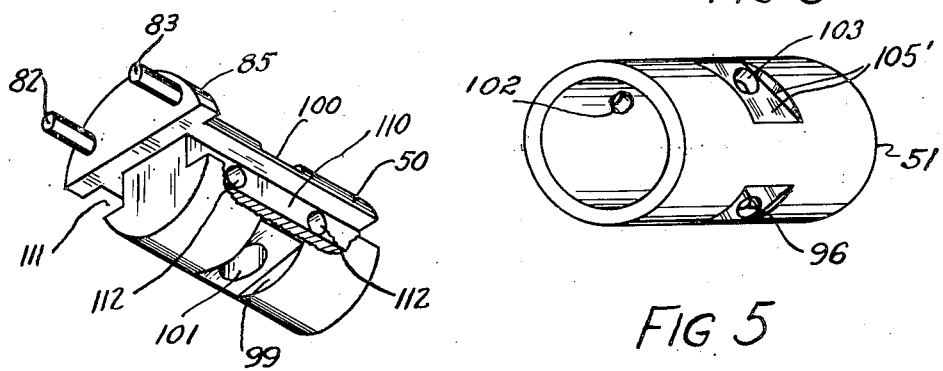
FIG 4
FIG 5
INVENTOR
COLUMBUS R. SACCHINI
By George M. Soule
ATTORNEY Oct. 5, 1948.   C. R. SACCHINI   2,450,564
FLUID OPERATED MOTOR WITH PISTON ACTUATED DISTRIBUTING
VALVE AND MANUALLY ACTUATED PARKING VALVE
Filed Oct. 2, 1944   3 Sheets-Sheet 3

INVENTOR
COLUMBUS R SACCHINI
BY George M. South
ATTORNEY

Patented Oct. 5, 1948

2,450,564

UNITED STATES PATENT OFFICE 2,450,564

FLUID OPERATED MOTOR WITH PISTON ACTUATED DISTRIBUTING VALVE AND MANUALLY ACTUATED PARKING VALVE

Columbus R. Sacchini, Willoughby, Ohio, assignor to The Marquette Metal Products Company, Cleveland, Ohio, a corporation of Ohio Application October 2, 1944, Serial No. 556,853

9 Claims. (Cl. 121—164)

This invention relates to an improved fluid operated motor of the type adapted to be used for driving a reciprocatable or oscillatable wiper element, as for windshields of air and land vehicles. The motor shown herewith is on the order of that disclosed and claimed in my Patent 2,404,747 issued July 23, 1946, application for which was co-pending herewith and the principal practical uses of the present motor as well as problems connected therewith are generally the same as those discussed in said application.

The principal objects hereof are: to provide a fluid operated reciprocating piston motor capable of being made in compact form, light weight and capable of delivering the necessary power for vehicle window and windshield wiping service at high vehicle speed and under other adverse conditions; to provide an improved valve and snap action mechanism for automatically reversing fluid flow in the motor to cause continued reciprocation of the power piston thereof; to provide an improved parking arrangement for fluid operated window or windshield driving motors, and to provide an improved arrangement for limiting the input of fluid, thereby to control the top motor speed.

A specific object is to provide a rotary fluid-reversing valve for a reciprocating motor of the type shown, wherein fluid introduced to and directed by the valve is so applied as to balance side thrust of the turning element of the valve on opposite sides of the turning axis, thereby overcoming to a large extent the tendency for the rotary element to resist being turned out of "stopped" position and enabling said element to be turned from one control position to another by a very small torque effort.

A further object is to provide a combined rotary valve and snap action mechanism in which the rotary element of the valve is dislodged from each stopped position by a hammer blow or impact of the snap action mechanism thereon, whereby to overcome initial static friction.

A further general object is to provide a fluid operated motor incorporating all the necessary operating features to enable it to meet the various practical requirements of aircraft installations and others.

A further object is to provide a fluid operated motor having an improved adjustable valving means operable to limit power input to the motor.

Other objects relate to constructional features of the motor as will be brought out later herein.

In the accompanying drawings:

Fig. 2 is a vertical sectional view taken generally along the line 2—2 on Fig. 1;

Fig. 4 is a perspective view of the main or reversing valve cylinder of the motor;

Fig. 5 is a perspective view of the valve sleeve in which the valve cylinder of Fig. 4 operates;

Fig. 8 is a plan view of a trunnion pivot element of the snap action toggle mechanism.

The motor operates properly in any turned position, hence terms such as front, rear, upward, and downward are not to be considered restrictive in any sense.

Figure 1:
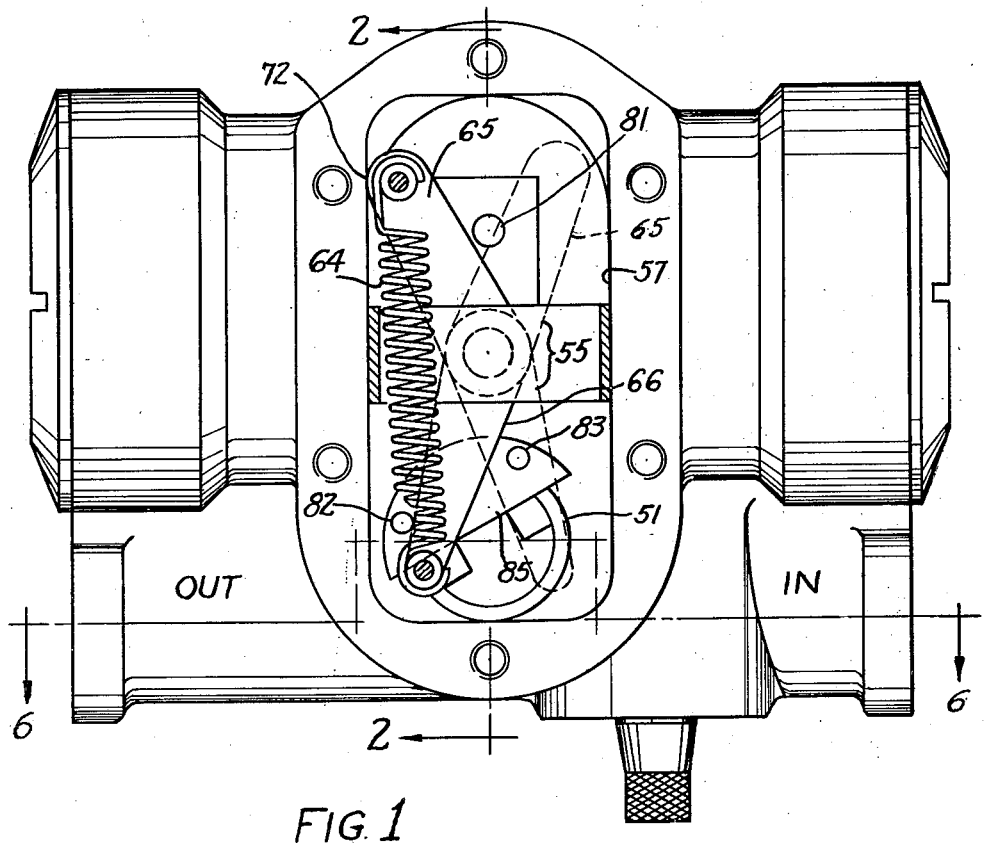
Fig. 1 is a rear elevation of a preferred form of fluid operated motor embodying the principles hereof, shown with a rear closure plate removed to expose a snap action toggle mechanism and associated parts.
Figure 3:
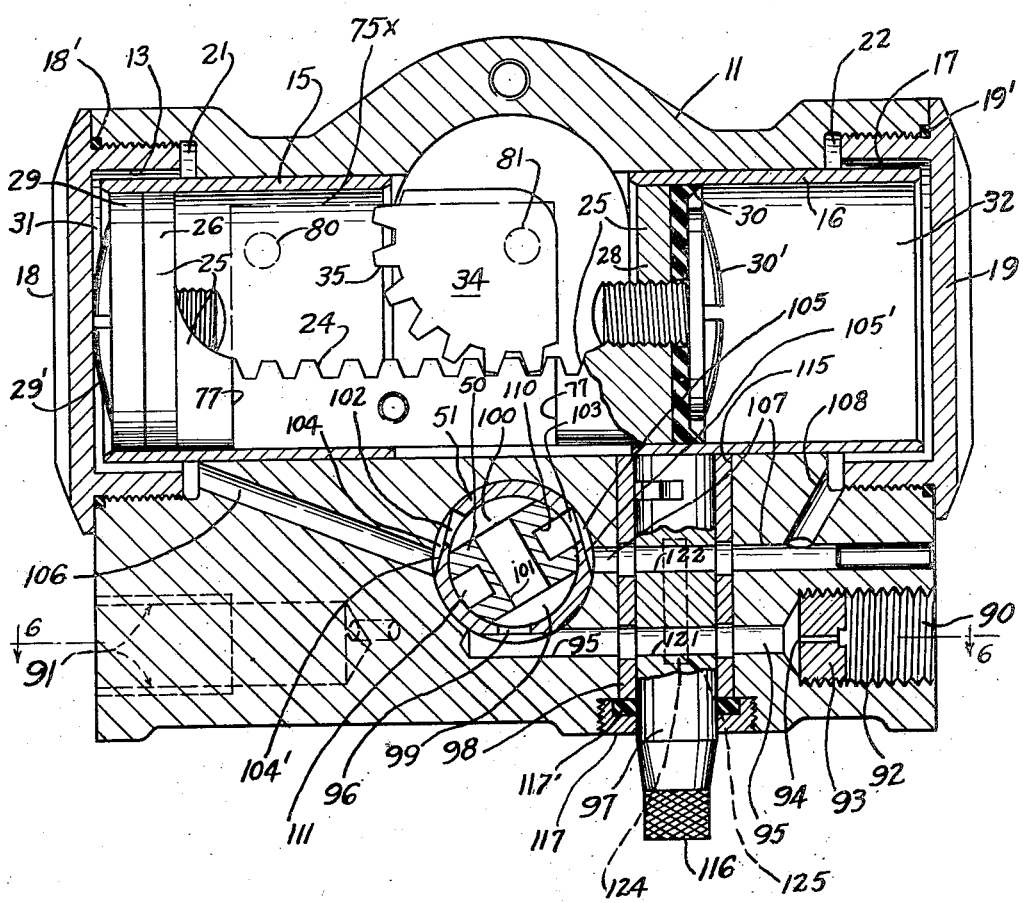
Fig. 3 is a vertical sectional view taken generally along the line 3—3 on Fig. 2 further showing the motor and valve construction.

Referring to Figs. 1 to 3, a tubular member or bushing 10, Fig. 2, operatively rigid with a generally hollow, irregularly shaped body member 11 for the motor is shown as rotatably supporting a power take-off shaft 12 having spline serrations at its outer end portion 14. The splined portion 14 is adapted to receive, in adjusted turned positions, a windshield wiper blade drive arm (not shown) or other load driving means having a complementary splined socket. The motor may be mounted rearwardly of a windshield (not shown) in any suitable manner with the tubular member 10 extending outwardly through the usual windshield supporting framework or casing.

As shown most clearly in Fig. 3, spaced apart piston sleeves 15 and 16 are pressed respectively into aligned openings in opposing side walls of the body 11, and have their outer ends extending freely into outer counterbored portions of the openings. The counterbored portions are threaded to receive respective externally flanged, cylinder-head-constituting plugs 18 and 19 which are cup-shaped to define inner cylindrical recesses 13 and 17. When the plugs 18 and 19 are screwed into position so that the flanges are in sealing engagement with suitable gaskets 18' and 19' the inner annular face portions of the plugs surrounding the recesses 13 and 17 are each spaced a short distance from the bottom of the respective counterbore to define annular grooves 21 and 22. The outer end portion of each of the sleeves 15 and 16 extends freely into the respective recess 13 or 17 in spaced relation to the bottom thereof to permit fluid to flow from the grooves 21 and 22 into piston chambers formed largely by the sleeves 15 and 16.

A central rack portion 24 of a piston 25 interconnects opposing piston head portions 26 and 28 which are slidably received within the sleeves 15 and 16, respectively, and which may be provided with suitable annular sealing members 29 and 30, respectively, suitably secured to the associated piston heads as by screws 29' and 30'. Piston chambers 31 and 32 are thus formed within the sleeves 15 and 16 between the outer faces of the head portions 26 and 28 and the plugs 18 and 19, respectively. The rack portion 24, as shown on Fig. 2, is generally rectangular in cross section, but the lower surface thereof is curved complementary to the inner surfaces of the sleeves 15 and 16.

The inner end of the take-off shaft 12 preferably has formed integrally therewith a gear sector 34 with teeth 35 maintained in mesh with teeth of the rack bar portion 24 of the piston by the tubular support 10 for said shaft which support is removable from the housing 11 in the particular arrangement shown.

The support 10 for the shaft 12 is an integral part of a tubular bracket member 36 screw threaded to the casing 11 as at 37. The bracket 36 has a flange 38 adjacent the threaded connection which latter when established, as by turning the flange with a wrench engaged with radial notches 39 in the flange, causes the flange to become seated in a counterbore 40 in the forward face of the housing 11. A necked portion 41 of the bracket adjacent the threads receives a ring 42 of elastic compressible sealing material which ring is expanded and forced over the threads for contraction against or into the neck 41. A counterbore portion 40' forwardly from the threaded connection 37 receives the sealing ring. The internal threads of the threaded connection 37 terminate adjacent the counterbore portion 40' in such manner that when the bracket is screwed into place the ring is compressed between the forward terminal surfaces of the internal threads and the flange 38 making a squeeze seal all around the bracket.

The rearward end of the bracket is in the form of a tubular flange 44 sufficiently smaller than the threaded opening (threaded connection 37) to enable insertion of the bracket into the position shown but nevertheless large enough to contain a sealing unit 45 of adequate capacity to block egress of operating fluid from the interior of the housing outwardly along the shaft 12. The sealing unit 45 comprises a threaded ring 46 recessed on its forward side to contain and compress a ring of elastic sealing material 47. The sealing unit 45 is made substantially according to U. S. Patent 2,376,011 issued May 15, 1945, out of application Serial No. 463,745, filed October 29, 1942, said unit being adjusted to secure the desired degree of compression of the ring 47 against the shaft by turning the annular member 46 in its threaded connection with the bracket. In effecting assembly of the shaft and bracket 36 into the housing the gear sector carrying portion of the shaft is passed through the opening which receives the bracket 36 into the interior of the housing and meshed with the teeth of the rack bar and thereupon the bracket with its sealing unit 45 assembled thereon is slid over the free end of the shaft and then threaded into place at 37 as described.

A rotary valve assembly for the motor comprises a valve cylinder 50 rotatably received within a sleeve 51 pressed into a complementary bore 52 extending through the front wall of the body 11. The forward end of the bore 52 (Fig. 2) is counterbored to receive a closure plate 54 which may comprise an initially concavo-convex expansion plug or disc of well known form or simply a flat disc pressed tightly into the counterbore. By means of this construction, it is a simple matter to accurately finish the inner surface of the sleeve 51 after the latter has been pressed into position and then to close the outer end of the bore 52 with the plate 54. The valve construction will be more fully described later.

A snap action toggle mechanism 55 is provided (in a generally rectangular recess 57 in the rear portion of the housing 11) between the piston and the valve cylinder in order to insure that the valve cylinder will, at cessation of operation of the mechanism, always occupy one of two relatively reversed positions and not some position between those two; whereby the wiper operated by the motor will stop at one end of its stroke and whereby upon resumption of the supply of working pressure the motor will be certain to operate.

The snap action mechanism 55 is of unitary character and constitutes with a rear closure plate 56 for the recess 57 of the housing 11, a self-sustaining sub-assembly which can be brought into proper operative association with the piston and valve mechanism by attachment of the closure plate 56 over the generally rectangular recess 57 as by screws 58. The closure plate may have a gasket, not shown, interposed between it and the adjacent housing walls surrounding the recess 57.

Said unitary toggle assembly is carried on a trunnion or hollow yoke member 59, see Figs. 1, 2 and 8, supported against the forward face of the closure plate 46. The trunnion or yoke member, as shown particularly by Fig. 8, is an open frame with mutually rigid horizontally extending spaced sides 59' which carry axially aligned cylindrical toggle-arm-supporting pivot pins 60 and 61. The pin 60, as shown, is riveted as at 62 adjacent an opening in the closure plate 56 against which a shoulder 63 of the pin is maintained tightly by the riveting. The pins 60 and 61 constitute a trunnion mounting for upper and lower toggle arms 65 and 66, respectively, each composed of a pair of parallel spaced arm members 67 essentially alike in construction but of different lengths. The members 67 of the arm 66 are somewhat longer than those of the arm 65.

The parallel arm members 67 of the arms 65 and 66 are held in parallel position by the trunnion pins 60 and 61 on which they are journalled and arm-member-connecting cross pins 68, forming distance pieces between the free ends of the arm members 67 and affording journals for free turning roller sleeves 69 slipped over the pins before assembly with the free ends of the arm members. The connecting pins 68 are reduced in diameter at their ends to provide shoulders abutting and spacing the arm members 67 distances apart slightly greater than the lengths of the respective sleeves 69. The reduced end portions of the connecting pins 68 are riveted over against the adjacent outward faces of the arm members 67 as at 68'. The roller sleeves 69 are peripherally grooved midway between their ends as at 69' for engagement with looped portions 70 and 71, respectively, of a tension spring 64 which passes through the opening provided by the parallel sides 59' of the trunnion member 59. The spring thus connects the outer ends of the two toggle arms 65 and 66 and tends to move one toggle arm counterclockwise and, simultaneously, the other arm clockwise beyond a dead center position in which the two toggle arms are in alignment.

The final swung position of the two arms 65 and 66 in one direction of operation is illustrated in full lines in Fig. 1, said arms being held in the position so illustrated by abutment of the arm 65 with an inner wall of the recess 57 at 72. At both extreme movements of the arm 65 the arm members 67 so strike the inner walls of the recess thus guarding the upper spring loop from impact. The other arm 66 of the toggle mechanism is maintained in a similarly limited position at each stroke but by operation of one of a pair of pins on the valve cylinder 50 engaged by the arm 66. The arm 65 is operated by the power piston 25 and the arm 66, through such pins, operates the valve cylinder to turn it alternately back and forth as will be described below.

The operating mechanism on the piston for engagement with the forwardly deposed arm members 67 of the arm 65 comprises a plate 75 secured to the rear face of the rack portion of the piston as by a single screw 76. The plate 75 is additionally maintained in position on the piston by reason of engagement of the side edges of the plate with shoulders 77, see Fig. 3 on the piston portion 24. The plate 75 is removed from Fig. 3 but the extent of the plate upwardly from the rack portion of the piston is indicated by broken lines 75x. It may be noted on Fig. 2 that the two forwardly disposed arm members 67 of the toggle arms 65 and 66 are maintained in position on the trunnion pin 61 by the riveted over forward ends of the cross pins 68 so that neither arm member 67 rubs against the plate 75. The forward end of the trunnion pin 61 also slightly clears the plate 75. The trunnion, or duplex pivot support for the toggle arm assembly prevents cantilever action which might tend to make the arms bind at their pivots under the force of the tension spring 64. The spring acts with equal force on all the arm members 67 as determined by its central position of attachment with respect to the cylindrical roller sleeves 69.

For operation of the reversing valve cylinder 50 the plate 75 is provided with two pins 80 and 81 the relative position of which on the plate is illustrated best diagrammatically on Fig. 3, said pins projecting rearwardly from the plate 75 a short distance for engagement with the forwardly positioned upper arm member 67 as mentioned above. When the piston moves in one direction, as to the right in Fig. 3, the pin 80 thus engages the arm 65 and swings the same from the solid line position shown by Fig. 1 and slightly past the dotted line illustrated position into an opposite position at the other side of the recess 57. At an intermediate portion of the travel of the piston from left to right the spring 64 of the toggle mechanism causes the lower arm 66 to be swung quickly from the position shown in solid lines in Fig. 1 to the corresponding opposite direction shown by broken lines. No movement of the arm 66 takes place until the upper arm 65 has been moved into and slightly past a dead center position in line with the arm 65 or approximately as shown by dotted lines. Then the snap action occurs. The valve cylinder is held against rotary movement by the lower toggle arm until the snap action occurs as will be described later.

When the arm 66 swings from its full line illustrated position on Fig. 1 to the broken line illustrated position the arm turns the valve cylinder 50 through an angle, for instance, of 60 degrees by virtue of abutment between the forward arm member 67 of the arm 66 and a pin 83 projecting from a segment-shaped rearwardly overhanging portion 85 of the valve cylinder positioned, as shown best by Fig. 4, forwardly beyond the valve sleeve 51 but closely adjacent the rearward extremity of the sleeve. A similar pin 82 on the portion 85 of the valve cylinder is engaged by the arm 66 during its return movement from the broken line to the solid line illustrated position. The pins are symmetrically located with respect to the center of the segmental extension 85 so that the valve is turned exactly through the same degree in each direction from a central neutral position of the valve cylinder. The pins 82 and 83 also are so located on the extension 85 of the valve cylinder as to arrest the arm 66 of the toggle mechanism and the valve cylinder when and only when the valve cylinder has been turned through the desired angle. One arrested position of the valve cylinder and toggle arm 66 is illustrated by Fig. 1. A line drawn through the center of the pin 82 and passing through the center of the valve cylinder is perpendicular to the adjacent side edge of the arm member 67 of the toggle arm 66 which makes driving contact with said pin. Therefore, the spring force continues to exert pressure on the pin 82 in the necessary direction to turn the valve cylinder until the above mentioned perpendicular position of the pin 82 is attained and thereafter the turning force of the spring on the valve cylinder becomes zero. Arrested relative position of the toggle arm and valve cylinder is attained without shock to the parts yet nevertheless the action is positive.

Referring now to the fluid system of the motor an inlet 90 for fluid under pressure is shown in Fig. 3 at the right hand lower portion of the housing 11 and an outlet 91 is similarly formed in the housing at the left and which may, for convenience and symmetry, be directly opposite the inlet. The inlet and outlet openings are threaded to receive appropriate high pressure fluid connections, the threads 92 of the inlet also accommodating a metering orifice plug 93 having a central hole 94 of accurately measured diameter so that the volume of fluid that can be introduced to the motor in a given time is definitely limited. Such limiting is always desirable in connection with hydraulic fluid motors where the supply pressure may run rather high at times, particularly if the motor is of light weight and therefore small size and designed to operate properly on relatively low pressure. The plug 93 can be readily replaced by a different plug having a different diameter orifice 94.

Fluid admitted at the inlet 90 and passed through the orifice 94 flows in a bore 95 aligned with the inlet to a port 96 in the valve sleeve 51. The bore 95, as shown, is arranged to be obstructed by a rotary valve plug 97 in a valve sleeve 98 and which functions as a "parking" control valve as will be described later. Assuming that the valve plug 97 is positioned, as in Fig. 3, so as not to obstruct the bore 95, fluid passes through the port 96 to a lower recess 99 in the valve cylinder and thence to a similarly disposed recess 100 at the upper side of the cylinder. An appropriate cross passage 101 in the valve cylinder connects the two recesses.

The lower recess 99 of the valve cylinder is always in open communication with the port 95. In the particular position of the valve cylinder 50 illustrated in Fig. 3, the upper recess 100 communicates with a lateral port 102 in the valve sleeve, there being another port 103 in said sleeve operatively opposite the port 102 and which, in said particular position of the valve cylinder, is closed to communication with the recess 100. When the valve cylinder 50 is turned clockwise through said angle of approximately 60 degrees the recess 100 communicates with the port 103 but not with the port 102. Appropriate channels 104 and 105 on the valve sleeve, formed for example as flat milling cuts 104' and 105' (cf. Fig. 5), enables communication of the two ports 102 and 103 with opposite bores in the housing 11 extending toward the axis of the valve cylinder. The channel 104 communicates with a diagonal bore 106 leading to the annular chamber 21 of the motor cylinder space 31, lying to the left of the piston 25. Thus, assuming the valve cylinder 50 is in the position shown in Fig. 3, fluid passes from the inlet 90 through the port 95, recess 99, and cross passage 101 to the recess 100, thence through port 102, recess 104 and bore 106 to the motor cylinder space 31 causing the motor piston to be driven to the right. Exhaust fluid from the motor cylinder space 32 at the right of the piston is simultaneously ejected through the valve cylinder 50 to the space 57 containing the snap action mechanism by the following arrangement.

Figure 6:
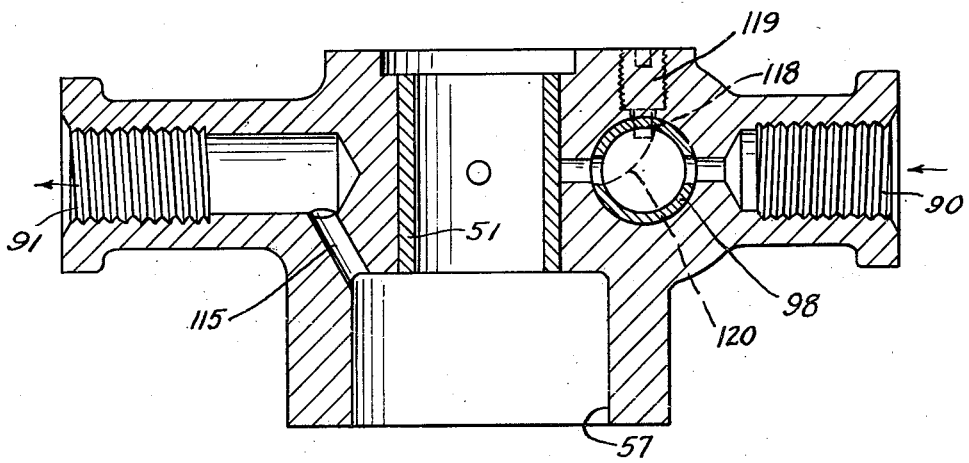
Fig. 6 is a sectional plan view of the main housing taken in a horizontal plane generally along the line 6—6 on Figs. 1 and 3 principally further to illustrate the inlet and outlet fluid conduits in relation to the valve bores of the housing.

Directly opposite the entrance portion of the bore 106 a bore is formed as at 107 parallel to the inlet bore 95 and crossing the bore in which the parking valve plug 97 is received. Assuming the parking valve is in the position shown on Fig. 3, the two ends of the bore 107 will be communicated through a cross passage in the plug 97 of the parking valve. A diagonal bore 108 communicates the right hand end of the bore 107 with the annular space 22 which leads to the right hand cylinder chamber 32 of the motor. The left hand end of the bore 107 intercepts the channel 105 formed by the flat cut 105' of the valve sleeve 51 so that said right hand motor cylinder space 32 is now communicated with the port 103 of said valve sleeve. The valve cylinder 50 has on opposite sides and leading from end to end of the uniform diameter portion of the cylinder, longitudinal channels 110 and 111. Those channels are in constant communication with each other through cross passages 112—see particularly Figs. 2 and 4. As will be clear from Fig. 2, the rearward ends of both channels 110 and 111 are in open communication at all times with the generally rectangular space 57 of housing 11 surrounding the snap action toggle mechanism. That space, in turn, is in constant communication with the outlet passage 21 through a diagonal bore 115 as clearly shown on Fig. 6.

When the valve cylinder is turned as previously described to its operatively opposite position (rotated clockwise 60 degrees from position of Fig. 3) then the recess 100 communicates only with the port 103, that is, it does not communicate with the port 102. Therefore, in said other position of the valve cylinder, the pressure fluid is admitted to the right hand motor cylinder space 32; and, since the channel 111 will then be aligned with the port 102, the left hand motor cylinder chamber 31 will be communicated with the exhaust fluid outlet 91 in exactly the same manner as the chamber 32 was previously made to communicate with said outlet.

Comparison of Figs. 3 and 4 will make clear the manner in which both inlet and exhaust fluid pressures are balanced about the center of the valve cylinders so that in the stopped positions of the valve cylinder 50 and while turning from one position to another there is no tendency for the cylinder to bind in its guiding sleeve. Such a function is particularly valuable when, because of the small sizes of the unit, very little power is made available to move the valve from stopped position or, in other words, to overcome static friction. The channels 110 or 111 are identical in width and diametrically opposite each other wherefore, because the two channels are interconnected through the passages 112, both sides of the valve are subjected to the same outlet pressure at all times so long as one of the channels is in communication with discharge fluid as is the channel 110 in relation to the piston chamber 32 in Fig. 3. While the valve is moving from that position into a position in which neither channel 110 or 111 communicates with a port of the valve sleeve the pressure in the two channels will nevertheless remain equalized. Similarly, since the flattening cuts on opposite sides of the valve cylinder forming the chambers 99 and 100 are of the same area and diametrically disposed with reference to the valve cylinder axis, inlet pressure fluid is always balanced on opposite sides of the valve cylinder through the cross connecting passage 101.

Referring further to the "parking" control mechanism (valve 97) for causing the shaft 12 to move to a position of rest, the sleeve 98 is pressed into the vertical bore 115 formed in the lower portion of the housing 11 and opening into the cylinder bore of the housing which receives the cylinder sleeves. The plug or valve cylinder 97 is rotatably received within the sleeve 98 and has a tapered lower end portion terminating in a cylindrical portion 116 suitably knurled to facilitate manual adjustment. If desired, a flexible shaft (not shown) may be secured to the portion 116 for operating the parking control mechanism from a remote station.

The lowermost end of the bore 115 is counterbored and threaded to receive a sealing nut 117 which, when threaded into position, forces a suitable packing 117' against the end face of the sleeve 98 and against the periphery of the cylinder 97. The packing 117' bears on the cylindrical adjacent surface of the valve plug 97 with sufficient force to prevent accidental dislocation of the plug.

The bore 115 intersects both the passage 95 and passage 107 as already mentioned. Axial movement of valve cylinder 97 out of position is prevented and the extent of rotary movement thereof is limited by a pin 118 removably secured to the housing 11 as by the threaded connection 119. The reduced inner end of the pin 118 projects through a lateral opening in the sleeve 98 into a slot 120 which extends for ninety degrees along the circumference of the valve cylinder 97. The cylinder may thus be rotated between two fixed turned positions disposed ninety degrees from each other.

Figure 7:
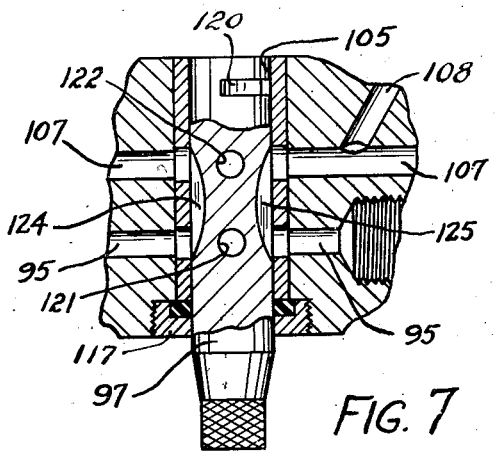
Fig. 7 is a detail sectional view of the "parking" valve control, with the adjustable control element turned to parking position, i. e. 90° from the position in which shown on Fig. 3

A pair of diametrical bores 121 and 122 (Figs. 3 and 7, are formed in the cylinder 97 in position to align with both parts of each of the bores or passages 95 and 107, respectively, when the cylinder is in one of its extreme turned positions (Fig. 3) and are normal to those passages when the cylinder is in the other of its extreme turned positions (Fig. 7). Displaced ninety degrees from the bores 121 and 122, Fig. 7, are a pair of diametrically opposed longitudinal double-dead-ended slots 124 and 125 of sufficient longitudinal extent to connect the passages 95 and 107.

When the valve cylinder 97 is in the turned position of Fig. 3 the motor operates continually if supplied with fluid under sufficient pressure. However, when the cylinder 97 is in the turned position of Fig. 7, the slot 124 causes high pressure fluid entering the motor at the port 90 to flow from the passage 95 into the passage 107 and thence into the piston chamber 32 where it forces the piston 25 to the left (Fig. 3). Assuming that the piston 25 is in its right hand position at the instant the cylinder 97 is turned to the position of Fig. 7, fluid is discharged from the piston chamber 31 in the manner already described until the valve cylinder 50 is moved to its turned position, not illustrated, after which additional fluid is forced from the chamber 31 through the passage 106, the port 102 and the valve chamber channels 110 and 111 to the chamber or space 57 of the housing and thence to the discharge outlet 91. Since an exhaust path for all of the fluid in the piston chamber 31 is provided, the piston 25 moves farther to the left than during normal operation and the shaft 12 is driven to a position of rest beyond its usual range of oscillation. So long as the valve 97 is in its turned position of Fig. 7, the piston 25 is held in its extreme left hand position by the static pressure of the fluid in the supply line (not shown) leading to inlet port 90. If a windshield wiper blade were being operated by the shaft 12, it may thereby be moved to a "parked" position beyond the usual range of vision and held in that position by fluid pressure. Returning the valve cylinder 97 to its initial position, Fig. 3, causes the motor to resume normal operation.

It will be apparent that speed control of the motor is also provided by the "parking" control mechanism just described. If the cylinder 97 is turned but slightly from its normal position of Fig. 3, the fluid paths between the passages 95 and 107 and the respective bores become restricted depending upon the extent of movement of the valve cylinder 97. Since the speed of the motor is dependent upon the amount of fluid supplied thereto, it is thus possible by limiting the rate of fluid flow through the passage 125 to vary the motor speed from a maximum to a slow speed near standstill regardless of the fixed volume-limiting effect of the orifice 94 of the plug 93. The valve 97, in other words, may be set to restrict the input of fluid to less than normally admitted for motor operation by the orifice plug 93.

If it is desired to change or adjust the normal stroke of the piston that can be accomplished by substituting larger or smaller abutment pins 80 and 81 on the plate 75 of the motor piston. If a set of smaller pins is used the effect will be to delay the operation of the snap action toggle mechanism in relation to the strokes of the piston, resulting in the performance of longer strokes. Substitution of larger pins shortens the strokes. By that means an infinite variation in stroke length is possible.

I claim:

1. In a fluid operated motor of the type having a reciprocatable piston means, a rotatable valve means for controlling the operation of the piston means, a snap action toggle mechanism including spring-connected coaxially pivoted toggle arms operatively interconnecting said valve means and said piston for driving said valve means with alternate rotary motion upon reciprocation of said piston, one of the toggle arms acting against circumferentially spaced abutments on the rotary valve means to turn the latter, said one toggle arm and the valve being brought respectively to arrested zero moment arm positions solely by mutual contact.

2. In a fluid operated motor of the type having a reciprocatable piston means, a rotatable reversing valve member having circumferentially spaced abutments parallel to its axis, said valve member being arranged for controlling the operation of the piston means, a snap action toggle mechanism including spring-connected coaxially pivoted toggle arms operatively interconnecting said valve member and said piston for driving said valve member with alternate rotary motion upon reciprocation of said piston, one of the toggle arms and the valve being brought respectively to arrested position at each reversing operation of the motor when the longitudinal center line of said arm is perpendicular to a line passing through the abutment and the center of rotation of the valve member.

3. In a fluid operated motor, a reciprocatable piston, a rotary reversibly acting valve arranged for controlling operating fluid in respect to the piston, a snap action toggle mechanism driven by said piston and acting on the valve to turn it from one position to a reversed position, said toggle mechanism comprising a pair of coaxially pivoted double toggle arms, and a spring connecting the free ends of said arms, one of the arms being arranged for operative engagement by said piston and the other for operative engagement with spaced abutments on the rotary valve, said snap action toggle mechanism including a relatively rigid member straddling the spring and having coaxial fixed pivots for each of the arms at opposite sides of the plane of operation of the spring.

4. In a fluid operating motor, a housing, a reciprocatable piston in the housing, a reversibly acting valve in the housing for controlling a supply of operating fluid for the piston, a snap action toggle mechanism driven by said piston and acting on the valve to move it from one fluid supplying position to a reversed fluid supplying position, said toggle mechanism comprising a pair of spring connected double toggle arms, one arranged for operative engagement by said piston and the other arranged for operative engagement with spaced abutments on the valve, said snap action mechanism including a rigid member having axially aligned and spaced apart pin portions pivotally supporting each of the arms at respective pin portions of said rigid member, and a rigid support removably secured to the housing and forming, with said rigid member and the toggle arms, a self-sustaining assembly unit separable from the remainder of the motor.

5. In a fluid operated motor of the class described, a housing, a reciprocatable piston in the housing, a reversibly acting valve in the housing for controlling the flow of pressure fluid alternately to opposite ends of the piston, a rigid bracket removably secured to said housing in spaced relation to the piston and valve, a snap action toggle mechanism including a hollow yoke member carried on and removable with said bracket and having axially spaced pivot pin portions, double toggle arms each pivotally supported on both pivot pin portions of the yoke member, and a spring connecting the free ends of the arms and passing through the hollow portion of the yoke member whereby to eliminate cantilever forces applicable to the toggle arms by such spring.

6. A fluid operated motor comprising a body formed with opposed piston chambers and a valve chamber, reciprocatable piston means in the piston chambers, said body being formed with a fluid supply and a fluid discharge passage and passages extending between said chambers, a valve member supported in said valve chamber and operable to control the flow of fluid between said fluid supplying passage and said passage extending between said chambers, a valve actuator mechanism constituting a driving connection between said piston means and said valve member for actuating said valve member automatically, and a second valve member arranged for directly interconnecting said fluid supply passage and one of said passages extending between said piston chambers, said second valve member including means for completing an exhaust fluid passage in loop arrangement with respect to said valve chamber simultaneously with interconnecting the aforesaid passages.

7. A fluid operated motor comprising a body formed with a bore providing a pair of opposed cylinders and a further bore providing a valve chamber, said body being formed with a fluid supply and a fluid discharge passage and passages extending between said bores, pistons mounted for reciprocation within said cylinders and connected to move in synchronism, a first plug type valve member rotatably supported in said chamber and operable upon rotation to control the flow of fluid between said fluid supplying passages and said passages extending between said bores, a valve actuator constituting a driving connection between said pistons and said first valve member for actuating said valve member automatically, and a second rotary plug type valve member for directly interconnecting said fluid supply passage and one of said passages extending between said bores, said second rotary valve member including means for completing a fluid exhaust passage in loop arrangement with respect to said valve chamber.

8. A fluid operated motor comprising a body having opposed first and second pressure chambers and power means reciprocated thereby as a result of admitting fluid pressure alternately to the chambers, a main fluid supply duct and a manually operable master valve arranged to control said duct, a fluid reversing valve automatically operated by the power means, receiving pressure fluid from the supply duct and operating to supply and exhaust fluid alternately to and from the chambers through first and second branch passages connecting the respective chambers and reversing valve, said first branch passage being also controlled by the master valve, one of the control positions of the master valve establishing a direct connection between part of the supply duct ahead of the master valve in the direction of fluid supply and said first branch passage to cause a non-reciprocating movement or arrest of the power means and simultaneously establishing a connection between the part of the supply duct lying beyond the master valve in said direction with said first branch passage between the master valve and the reversing valve whereby the second branch passage can exhaust fluid through the reversing valve irrespective of the instantaneous position of the latter.

9. In a fluid operated motor, a housing, a reciprocatable piston in the housing, a reversibly acting valve in the housing for controlling a supply of operating fluid for the piston, a snap action toggle mechanism driven by said piston and acting on the valve to move it from one fluid supplying position to a reversed fluid supplying position, said toggle mechanism comprising two toggle arms each formed of a pair of spaced interconnected generally parallel side elements, means pivotally connecting elements of each arm in overlapping relationship at a common pivot axis, and a spring connecting the two arms at points lying remotely of the pivot axis, said spring being movable between the spaced elements and across the pivot axis, said means including a mounting bracket on which the arms, spring and pivot means are carried as a complete working assembly, said bracket being removably attached to the housing.

COLUMBUS R. SACCHINI.

REFERENCES CITED

The following references are of record in the file of this patent:

UNITED STATES PATENTS

| Number | Name | Date |
|---|---|---|
| 456,837 | Olds | July 28, 1891 |
| 660,010 | Ezell | Oct. 16, 1900 |
| 746,955 | Goodwin | Dec. 15, 1903 |
| 1,012,164 | Rose | Dec. 19, 1911 |
| 1,395,604 | Skinner | Nov. 1, 1921 |
| 1,424,890 | Folberth | Aug. 8, 1922 |
| 1,487,405 | Skinner | Mar. 18, 1924 |
| 1,567,328 | Oishei | Dec. 29, 1925 |
| 1,639,043 | Malouf | Aug. 16, 1927 |
| 1,663,666 | Moskovitz et al. | Mar. 27, 1928 |

FOREIGN PATENTS

| Number | Country | Date |
|---|---|---|
| 473,296 | Great Britain | Oct. 11, 1937 |
| 110,074 | Germany | Apr. 19, 1900 |
| 553,877 | Germany | July 1, 1932 |